US005417146A

United States Patent [19]

Zimmer et al.

[11] Patent Number: 5,417,146

[45] Date of Patent: May 23, 1995

[54] CARBONATION APPARATUS

[75] Inventors: Kenneth J. Zimmer, New Brunswick; Michael J. De Young, Oak Ridge, both of N.J.

[73] Assignee: Standard Keil Industries, Inc., Allenwood, N.J.

[21] Appl. No.: 238,006

[22] Filed: May 3, 1994

[51] Int. Cl.[6] .......... A23F 3/00

[52] U.S. Cl. .......... 99/323.1; 220/565; 261/DIG. 7

[58] Field of Search .......... 99/323.1, 323.2, 275, 99/323.3; 261/DIG. 7; 426/67, 477; 422/105, 112, 305; 220/565, 608

[56] References Cited

U.S. PATENT DOCUMENTS

| | | | |
|---|---|---|---|
| 1,972,994 | 10/1932 | Huntley et al. . | |
| 2,019,479 | 6/1932 | Buttner | 261/28 |
| 3,282,571 | 3/1964 | Guggenberger | 261/1 |
| 4,304,736 | 12/1981 | McMillin | 261/DIG. 7 |
| 4,708,827 | 11/1987 | McMillin | 99/323.1 |
| 5,011,700 | 4/1991 | Gustafson | 426/477 |
| 5,021,250 | 6/1991 | Ferguson | 426/477 |
| 5,112,539 | 5/1992 | Parnet | 261/128 |
| 5,140,822 | 8/1992 | Gupta | 62/50.1 |
| 5,178,799 | 1/1993 | Brown et al. | 261/39.1 |
| 5,192,513 | 3/1993 | Stumphauzer et al. | 422/305 |

*Primary Examiner*—Robert W. Jenkins
*Attorney, Agent, or Firm*—Schweitzer Cornman & Gross

[57] ABSTRACT

An apparatus for the carbonation of liquids, such as water, comprises a liquid storage tank coupled to a carbonizer having a carbonated liquid holding tank which presents a carbon dioxide atmosphere to liquid introduced therein. The liquid introduced into the holding tank blends with the carbon dioxide atmosphere, and is held in the tank for withdrawal upon demand. The liquid storage tank maintains a liquid therein at ambient pressure, and has a draw tube for liquid removal positioned proximate the bottom wall of the tank. The tank has a channel system in the tank bottom to allow liquid to collect therein to maximize the amount of liquid which may be withdrawn. Liquid level switches sense the level of liquid within the channel system and are coupled to the carbonizer to prevent its operation when insufficient liquid is present in the storage tank.

5 Claims, 1 Drawing Sheet

CARBONATION APPARATUS

The present application relates to a new and improved apparatus for the carbonation of water by the addition of carbon dioxide thereto for use in connection with the preparation of soft drinks and the like.

BACKGROUND OF THE INVENTION

The combining of carbon dioxide gas with water to form a mixture thereof as a drink base and for other purposes is well established. Such systems provide pressurized liquid, typically water, to a blender or mixing device where carbon dioxide is combined with the liquid. This produces a carbonation value, at typical ambient temperatures, of approximately 3.2 to 3.4. Such a carbonation level is for many purposes just adequate, as it is generally believed that higher carbonation levels provide a better drink, and maintain freshness of the drink over a longer period of time. The pressurization and pumping equipment required for the water for such conventional systems results in a relatively large, bulky and heavy system, ill-suited to transport and utilization in low-volume, cost-driven environments.

It is accordingly a purpose of the present invention to provide a carbonation system which does not require pressurization of the liquid prior to blending with the carbon dioxide.

Another purpose of the present invention is to provide a carbonation system having a free-standing and independent liquid source.

A further purpose of the present invention is to provide a carbonation system in which the carbonation pump is provided with water at ambient pressure conditions.

Yet another purpose of the present invention is to provide a carbonation system which can obtain higher carbonation levels than that previously achieved with pressurized systems.

Still another purpose is to provide an economical carbonation system, which can achieve high efficiency utilizing presently available carbonator units.

BRIEF DESCRIPTION OF THE INVENTION

In accordance with the above and other objects and purposes the present invention comprises a self-contained liquid source, typically in the form of a tank positioned to provide a minimal head of liquid at the carbonator input. The tank is preferably dimensioned to be portable, and is provided with a construction which allows maximum removal of the stored liquid prior to refill. Control means are provided to disconnect the carbonizer unit when the tank is depleted, such control means coacting with the construction of the tank to insure that the maximum amount of liquid is removed from the tank before the control means are activated. By use of a zero-pressure tank, carbonation level values of 3.7 to 3.8 can be obtained with an apparatus of efficient design and operation, and without the utilization of complex pumping and pressurizing units as previously required.

BRIEF DESCRIPTION OF THE DRAWINGS

A fuller understanding of the present invention will be obtained upon consideration of the following detailed description of a preferred, but nonetheless illustrative embodiment thereof, when reviewed in association with the annexed drawings, wherein.

DETAILED DESCRIPTION OF THE INVENTION

Figure 1:
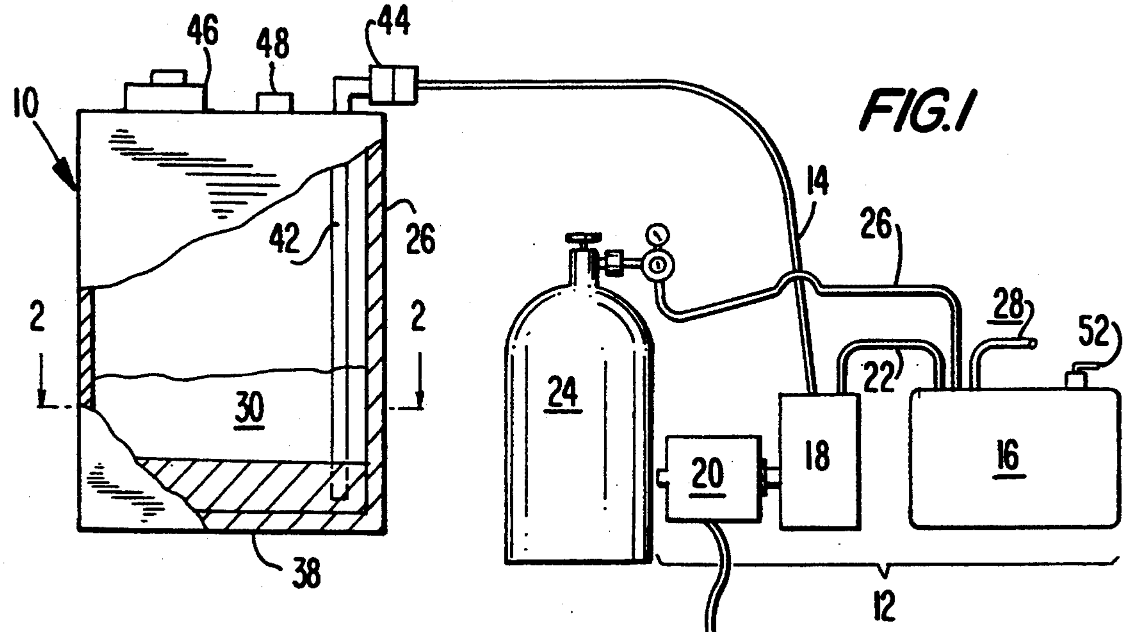
FIG. 1 depicts the system of the present invention, presenting in a side elevation view, partially broken away, the storage tank thereof.

As seen in the Figures, the carbonator system of the present invention consists of a liquid storage tank 10, typically holding water, coupled to a conventional carbonator 12 through line 14. The carbonator 12 comprises a pump 18 driven by electric motor 20 which causes a spray of the water withdrawn from tank 10 to be created in mixing/holding tank 16 through holding tank inlet line 22. Pressurized carbon dioxide from gas tank 24 is introduced into tank 16, through line 26. The tank is gas and liquid tight, and thus allows a carbon dioxide atmosphere to be developed therein. Upon initial fill of the entry tank by the gas, ambient air is bled off. The water spray through the carbon dioxide atmosphere causes a portion of the carbon dioxide to blend with the water, the resulting carbonated water being stored in the tank. The carbonated water may then be withdrawn through valved line 28, the pressure within tank 16 generated by the carbon dioxide atmosphere providing the drive for liquid dispensation. Control means, such as level gauge 52, are coupled to pump motor 20 to maintain an appropriate volume of liquid in the storage tank. The carbonator 12 may be of conventional design, such as a McCann E200092 carbonator, of Habco Beverage Systems, Inc.

The present invention utilizes a direct connection between storage tank 10 and carbonator 12, without the necessity for independent means to pressurize the liquid 30 in the tank. Accordingly, the resulting system is of compact and efficient design.

Storage tank 10 may be of any desired size. To allow the tank to be easily transported, even when filled with liquid, it may have general dimensions of 20 inches high×14 inches long×10 inches wide. The container may be constructed of a rigid plastic to provide both rigidity and strength and light weight. The opposed end walls 32 may each be formed with a recess 34, creating a pair of integral, opposed handle areas at the top edges to facilitate lifting of the tank.

Figure 2:
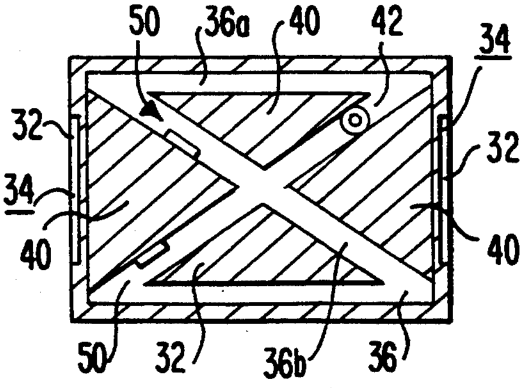
FIG. 2 is a top plan view of the tank in section along line 2—2 of FIG. 1.
Figure 3:
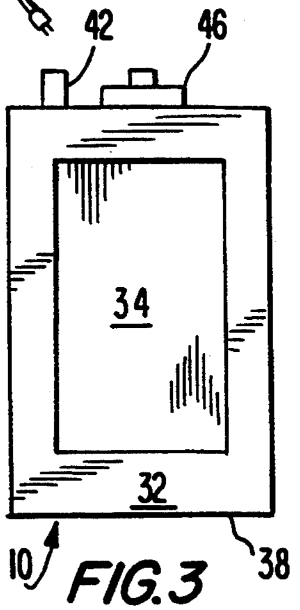
FIG. 3 is an end elevation view of the tank.

The tank may be preferably further formed with a channel system 36, best seen in FIG. 2, formed in the bottom wall 38, the channels being formed between the elevated land sections 40 of the bottom wall. The depth of the channels may be about 3 inches. In a preferred embodiment, the channel system may comprise a pair of channels **36*a* extending along the side walls of the tank, the ends of the channels 36*a* being connected by the intersecting channels 36*b*** which extend diagonally across the bottom wall. Such an arrangement insures drainage of the liquid into the channel system as the tank liquid level drops.

Draw tube 42 extends downwardly through the top wall of the tank, its bottom end being positioned in one of the channels 36. The top end of the draw tube and the adjoining end of line 14 may be provided with an appropriate quick-disconnect connector set 44, as known in the art, to provide connection therebetween. The connector element on line 14 preferably includes an integral sealing means to prevent the introduction of air and the loss of head in the line when disconnected. By utilizing the channel construction and positioning the bottom end of the draw tube within a channel, a greater portion of the liquid can be removed from the tank 10 as opposed to a construction in which the tank bottom is flat, as the liquid collects in the channels and, for a given volume of remaining water, provides a greater depth, thus allowing immersion of the draw tube bottom at relatively low liquid volumes.

In addition to draw tube 42, the top wall of the tank may include a fill/clean-out port 46 with a matching cover, as well as a vent 48, which equalizes pressure within and without the tank as liquid is withdrawn. This allows the liquid to be withdrawn from the tank at minimal pump drawing, contributing to efficient operation of the system.

A pair of level switches 50 are mounted to the tank bottom wall, their sensor portions extending into the body of the tank, responsive to the liquid level in the channels 36. Utilizing a pair of such level switches in series prevents false level readings from occurring when the tank is at an angle, whereby a single level switch might indicate sufficient water level while the draw tube bottom end is not in contact with the water. In addition, the use of two switches reduces the chance of failure. The limit switches are coupled to the pump motor 20 for carbonator 12, deactivating the pump when the level in the tank drops below a predetermined level. The switches operate in conjunction with holding tank level gauge 52 to control pump operation. Typically, the limits for the level switches 50 may be set at 1½ inches in the channels, providing sufficient headroom for the lower end of the draw tube within the remaining liquid to insure that the carbonator will not lose prime, which may result in damage.

In operation the storage tank 10 and carbonator 12 are connected together by the line 14, both units typically being positioned at the same height to avoid creation of a pressure differential therebetween. The tank is filled with sufficient liquid for operation and the carbonator is energized. The pump 18 of the carbonator provides the only draw for the liquid, which is combined with the carbon dioxide from tank 24 without any additional pressure gradient being placed upon the liquid. The resulting highly carbonated liquid is stored in holding tank 16 and dispensed through line 28 upon demand.

We claim:

1. Apparatus for the carbonation of liquids, comprising a liquid storage tank having opposed top and bottom and end and side walls, said tank including means for maintaining a liquid therein at ambient pressure; a draw tube having a first end positioned within said tank proximate said bottom wall and a second end exterior to said tank; and a carbonator having a liquid input port coupled to said tube second end and an output line for dispensing carbonated liquid; said bottom wall of said tank including means for collecting liquid in designated lower portions of said tank at low liquid volumes to increase the effective height within said tank of said low liquid volumes.

2. The apparatus of claim 1, wherein said liquid collecting means comprise a channel system in said bottom wall.

3. The apparatus of claim 2, wherein said channel system comprises first and second channels located proximate said side walls joined by channels extending diagonally across said bottom wall.

4. The apparatus of claim 3 further comprising at least one liquid level switch mounted to said bottom wall for sensing the liquid level in said channel system.

5. The apparatus of claim 3, wherein said end walls include integral handgrips.

* * * * *